United States Patent
Jones et al.

(10) Patent No.: US 8,252,174 B2
(45) Date of Patent: Aug. 28, 2012

(54) VEHICLE-INTEGRATED WATER HARVESTING SYSTEM

(75) Inventors: Thomas A. Jones, Macomb, MI (US); Therese A. Tant, Royal Oak, MI (US); Gregory A. Major, Farmington Hills, MI (US); Frances H. James, Sunnyvale, CA (US); Jeffrey M. Pleune, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 441 days.

(21) Appl. No.: 12/504,417

(22) Filed: Jul. 16, 2009

(65) Prior Publication Data

US 2010/0025311 A1  Feb. 4, 2010

Related U.S. Application Data

(60) Provisional application No. 61/085,536, filed on Aug. 1, 2008.

(51) Int. Cl.
*B01D 17/12* (2006.01)
*B01D 35/02* (2006.01)

(52) U.S. Cl. .............. 210/149; 62/181; 62/184; 62/239; 62/244; 62/272; 62/389; 62/390; 210/181; 210/257.1; 222/146.1; 222/146.6; 222/189.06; 222/189.11

(58) Field of Classification Search .................. 210/149, 210/175, 181, 194, 257.1; 222/146.1, 146.2, 222/146.6, 160, 189.11, 145.1, 145.5, 189.06; 62/239, 259.1, 259.4, 272, 389, 390, 177, 62/181, 183, 184, 244; 137/98, 334, 338, 137/340; 165/41, 42, 58, 61, 200, 202; 454/69, 454/75

See application file for complete search history.

(56) References Cited

U.S. PATENT DOCUMENTS

| | | | | |
|---|---|---|---|---|
| 3,276,634 | A * | 10/1966 | Arnot | 222/144.5 |
| 4,725,359 | A * | 2/1988 | Ray | 210/640 |
| 5,190,025 | A * | 3/1993 | Chen | 126/19.5 |
| 5,435,151 | A * | 7/1995 | Han | 62/272 |
| 5,497,918 | A | 3/1996 | Brilanchik | |
| 5,983,988 | A * | 11/1999 | Hong | 165/43 |
| 6,076,706 | A | 6/2000 | Kritchman | |
| 6,209,573 | B1 | 4/2001 | Chau | |
| 6,460,361 | B1 | 10/2002 | Faria | |
| 6,868,690 | B2 | 3/2005 | Faqih | |
| 7,000,409 | B2 | 2/2006 | Mazzetti | |
| 7,036,314 | B2 | 5/2006 | Hoffjann et al. | |
| 7,089,763 | B2 * | 8/2006 | Forsberg et al. | 62/635 |
| 7,108,094 | B2 | 9/2006 | Daniels | |
| 7,208,239 | B2 | 4/2007 | Hoffjann et al. | |
| 2002/0046569 | A1* | 4/2002 | Faqih | 62/188 |
| 2004/0040322 | A1* | 3/2004 | Engel et al. | 62/177 |
| 2006/0169649 | A1 | 8/2006 | Hsueh et al. | |
| 2009/0084728 | A1 | 4/2009 | Kirts | |

FOREIGN PATENT DOCUMENTS

JP    2002267285 A    9/2002

(Continued)

*Primary Examiner* — Joseph Drodge
(74) *Attorney, Agent, or Firm* — Quinn Law Group, PLLC

(57) ABSTRACT

A vehicle-integrated water harvesting system is provided that enables water-vapor or condensation in a vehicle to be captured, and made available onboard the vehicle for drinking or other uses. The system includes a water emitting component and may include a purification system operatively connected to the water emitting component. The purification system at least partially purifies the water and then sends the purified water to a storage reservoir or directly to a dispenser or outlet.

9 Claims, 3 Drawing Sheets

FOREIGN PATENT DOCUMENTS

| | | |
|---|---|---|
| JP | 2003275703 A | 9/2003 |
| KR | 198902518 B1 | 7/1989 |
| KR | 2008020175 A | 3/2008 |
| KR | 2009000312 A | 1/2009 |

* cited by examiner

US 8,252,174 B2

VEHICLE-INTEGRATED WATER HARVESTING SYSTEM

CROSS-REFERENCE TO RELATED APPLICATIONS

This application claims the benefit of U.S. Provisional Patent Application No. 61/085,536, filed Aug. 1, 2008, and which is hereby incorporated by reference in its entirety.

TECHNICAL FIELD

The invention relates to a water harvesting system integrated in a vehicle.

BACKGROUND OF THE INVENTION

Globally, drinking water is in short supply. Researchers are striving to find alternative methods of water gathering and purification. Additionally, consumers are becoming increasingly concerned about the purity levels of tap water, and are purchasing bottled water in record numbers, leading to energy expenditures associated with producing, recycling and/or disposing of the bottles.

SUMMARY OF THE INVENTION

Various systems for collecting and using (i.e., harvesting) water from a water-emitting component of a vehicle are provided. For example, a vehicle-integrated water-harvesting system is provided that enables water-vapor or condensation occurring on a vehicle, such as a by-product of vehicle operations, to be captured, purified and made available onboard the vehicle for drinking. Thus, the purified water system is integrated with other vehicle systems and components. The integrated purified water system includes a water emitting component and a purification system operatively connected to the water emitting component. The purification system purifies the water to acceptable drinking level standards and then sends the purified water to a storage reservoir. A temperature controller is operatively connected to the storage reservoir and functions to maintain the water at a predetermined temperature or within a predetermined temperature range. Different embodiments of the system use various methods of regulating the water temperature. A dispensing valve is operatively connected with the storage reservoir, and may be opened to provide the purified, temperature controlled water through a dispensing outlet. Extraneous water remaining at the valve may be rerouted to the purification system to ensure purity. The entire system is integrated in an automotive vehicle. The water emitting component is a component having other uses on the vehicle, such as an air conditioning condenser, an electric motor cooling system, a fuel cell, etc. Thus, water that would otherwise likely be discarded or naturally evaporate or drip from the vehicle is captured and processed for onboard drinking.

Another vehicle-integrated water harvesting system is provided in which water is directed from the water-emitting component to a wiper fluid reservoir. A concentrate of washer in a tablet or liquid form in the reservoir or in a conduit leading from the water-emitting component to the reservoir mixes with the water to create washer fluid. Thus, water that would otherwise be discarded is used so that a constant supply of washer fluid is available in a maintenance free manner (i.e., washer fluid need not be manually added).

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
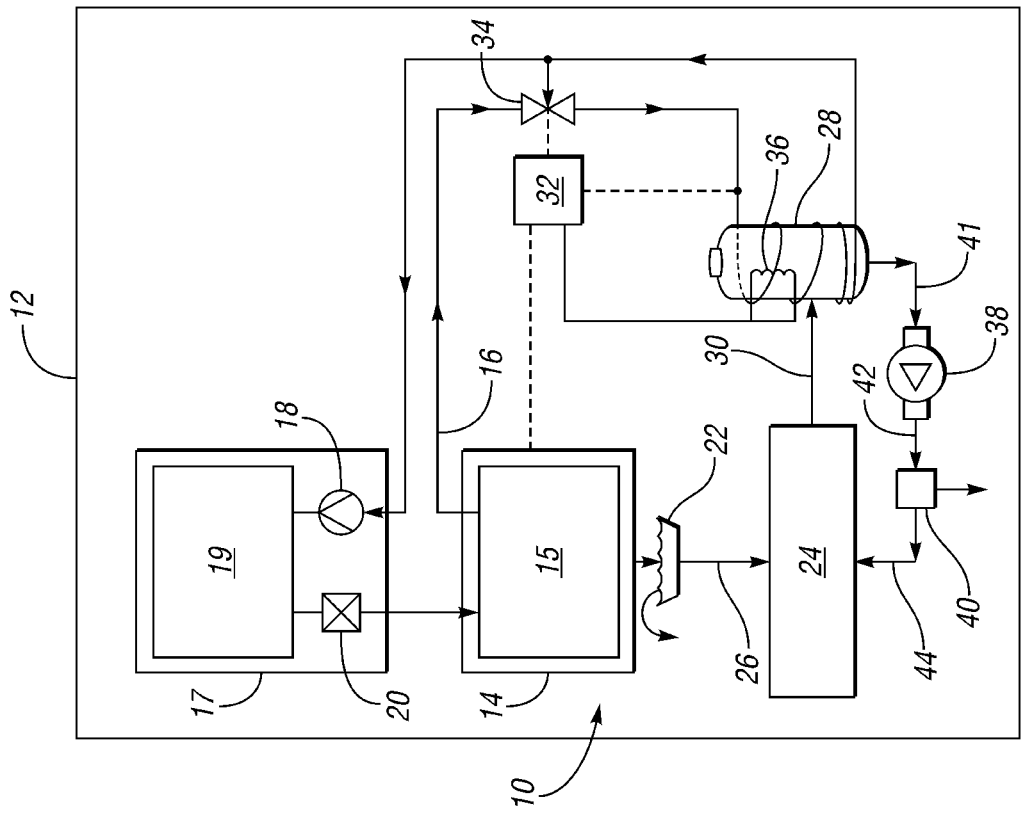
FIG. 1 is a schematic illustration of a first embodiment of a vehicle-integrated water harvesting system.

Referring to FIG. 1, a vehicle-integrated water harvesting system 10 is shown on a vehicle 12. The system 10 includes a water-emitting component 14. The water-emitting component 14 may be any component that produces water in liquid or vapor form as a by-product of its intended function. For example, in the embodiment of FIG. 1, the water-emitting component 14 is a heating, ventilation and cooling (HVAC) system or module 14 that produces water condensate as a by-product of controlling the temperature of passenger compartment air. The HVAC module 14 includes an evaporator 15 having cool refrigerant within cooling coil 16. Outside air flows over coil 16 to cool the air before entering the passenger compartment. The HVAC module 14 is operatively connected to vehicle system components 17 which include a compressor 18 that condenses the gas within cooling coil 16, after it has been used for cooling purposes, causing it to become hot high pressure gas which runs through a set of coils in condenser 19 to dissipate heat and condenses into liquid before routing through an expansion device 20. Cooling of the outside air over the coil 16 of the evaporator 15 condenses water vapor in the air, which is collected in sump 22. Excess water in sump 22 is allowed to overflow.

An HVAC module 14 may be found on a vehicle of any propulsion type. Alternative water-emitting components that may be used within the vehicle-integrated water harvesting system 10 may be available only on certain propulsion types, such as a fuel cell on a fuel cell vehicle, or a motor/battery cooling system in the case of an electric or hybrid electric vehicle. In most cases, the water-emitting component 14 is located under the hood of the vehicle, and is not in the passenger compartment. The vehicle system components 17 are typically under the hood. As used herein, the phrase "under the hood" means in a compartment of the vehicle containing the propulsion device, such as the engine or fuel cell, and is used whether or not there is an operable hood on the vehicle.

The vehicle-integrated water harvesting system 10 also includes a purification system 24 capable of purifying water to accepted drinking water standards. A tube or system of tubes 26 route the condensate to the purification system 24, either via gravity or with the assistance of a pump. Alternatively, the purification system 24 could mount directly to the water-emitting component 14, in which case the purification system 24 would be adjacent the water-emitting component, such as under the hood, on the cab or on the roof. The purification system 24 could be a simple filter, or may be a more complex, commercially-available system. One exemplary purification system 24 may include a condensation unit, filters, and a bacteria-killing device, such as ultraviolet light. The filters of such an exemplary system would be capable of removing unacceptable materials such as volatile organic carbons. Those skilled in the art of water purification will readily understand such systems, as well as drinking water standards.

After being purified, the water is routed to a storage reservoir 28 operatively connected with the purification system 24 through a tube or series of tubes 30, or mounted directly to the purification system 24. The storage reservoir 28 may be mounted under the hood, within the body structure, such as in a door cavity or under the dash panel, or may be mounted within the passenger compartment.

A temperature controller 32 is operatively connected to the storage reservoir 28 and functions to achieve and maintain a predetermined temperature or temperature range of the stored and purified water. The temperature controller 32 may be an electric-powered heating and cooling unit run off of battery power. Alternatively, in the case of vehicles having an HVAC module, such as vehicle 10, the temperature controller 32 may be integrated with or operatively connected with the HVAC module to use the heating and cooling capabilities of the HVAC module or system to heat or cool the water in the reservoir 28.

For example, in FIG. 1, the temperature controller 32 controls a valve 34 that allows the cooling refrigerant in cooling coil 16 to be routed past the reservoir 28 before returning to the compressor 18, as needed to control temperature in the reservoir 28 to a predetermined temperature or temperature range. The temperature controller 32 also controls a heating element 36 to heat the water in the reservoir 28 as needed. Dashed lines between temperature controller 32 and water-emitting component 14 and coil 16 indicate the ability of temperature controller 32 to monitor the temperature and other operating parameters of these components. Evaporator condensate is typically cold, being formed upon the evaporator 15, which is a relatively cold part of the HVAC module 14. However, in other instances, the condensate or vapor collected from the water-emitting component 14 will be at an elevated temperature and will require cooling to enable a suitable drinking temperature. In other instances, when relatively high temperature drinking water is desired, such as for tea, little or no cooling of the purified water in the reservoir 28 will be required. In that case, the temperature controller 32 may cause heating element 36 to heat of the water in the reservoir.

A dispensing valve 38 is situated in the passenger compartment and is controllable manually, such as by turning a knob, pressing a button, via mouth suction device or straw-like device, or may be controllable by voice activation. When open, the valve 38 directs water from the reservoir 28 to a dispensing outlet 40 through tubes 41, 42 for collection in a cup, mug, thermos, or other container. Excess water collected in the tubes 41, 42 between the reservoir 28 and the outlet 40 can be rerouted through tubes 44 via a pump or gravity, back to the purification system 24 to ensure that no water settles in the tubes 41, 42.

Figure 2:
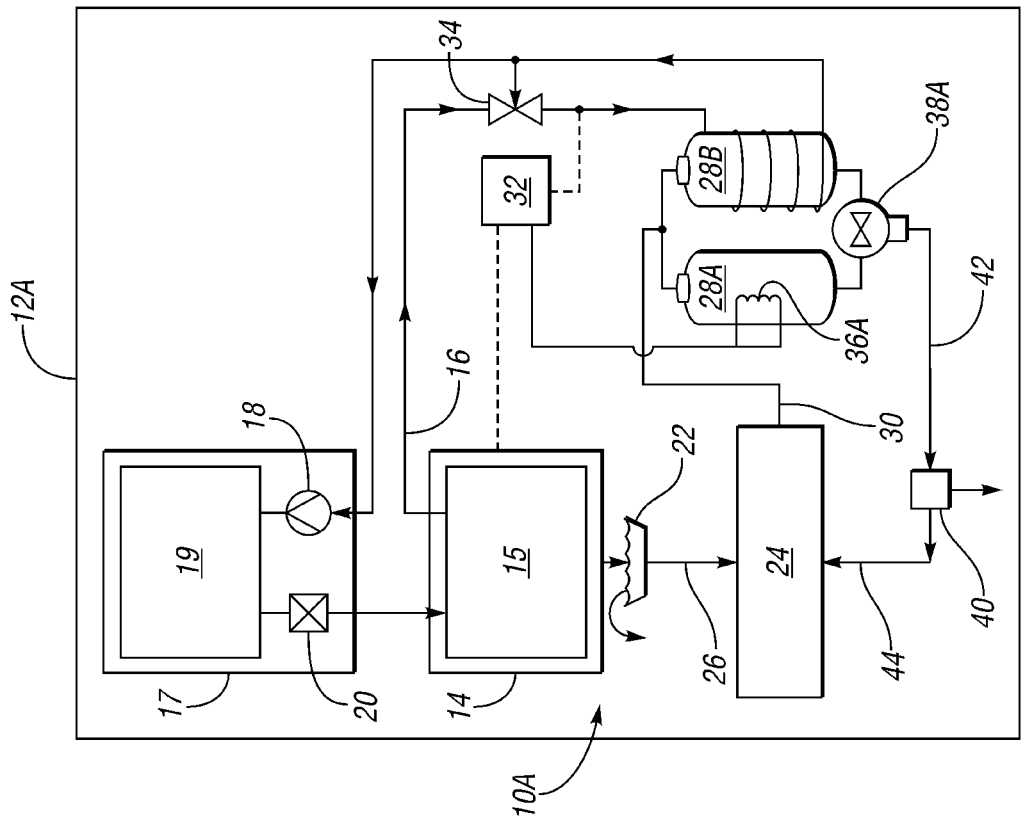
FIG. 2 is a schematic illustration of a second embodiment of a vehicle-integrated water harvesting system.

FIG. 2 shows a second embodiment of a vehicle 12A having a vehicle-integrated water harvesting system 10A. Components of water purification system 10A that are identical to those of vehicle-integrated water harvesting system 10 of FIG. 1 are referred to with like reference numbers in the drawings. The vehicle-integrated water harvesting system 10A utilizes a dual-chambered reservoir 28A, 28B, with the temperature controller 32 ensuring that a first chamber 28A is at a first relatively high temperature or in a first relatively high temperature range, while a second chamber 28B is at a lower temperature or temperature range so that, for instance, both hot and cold drinking water are available. Thus, the cooling coil 16 is routed only past second chamber 28B, while the heating element 36A is controlled by temperature controller 32 to heat only first chamber 28A. Water is routed through tubes 30 from the purification system 24 to both chambers 28A, 28B. The dispensing valve 38A is a two-way valve that can be turned to adjust the amount of water coming from each of the chambers 28A, 28B.

Figure 3:
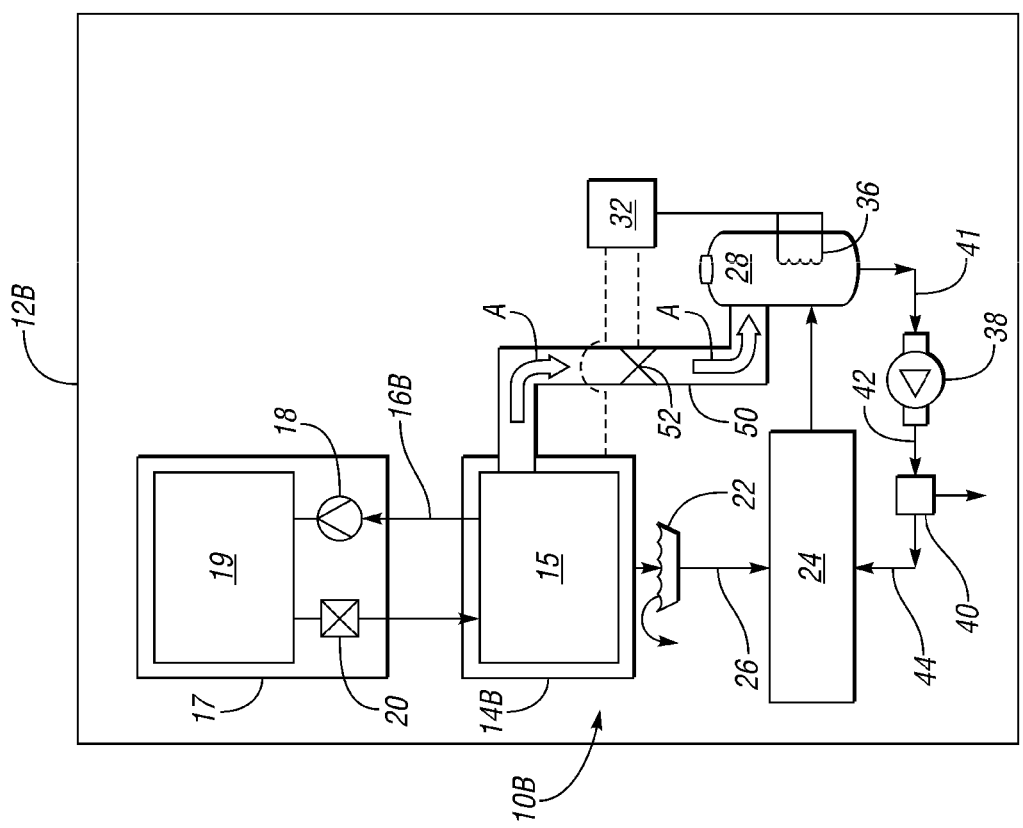
FIG. 3 is a schematic illustration of a third embodiment of a vehicle-integrated water harvesting system.

FIG. 3 shows a third embodiment of a vehicle 12B having a vehicle-integrated water harvesting system 10B. Components of water purification system 10B that are identical to those of water purification 10 of FIG. 1 are referred to with like reference numbers in the drawings. The system 10B includes a water-emitting component 14B that is an HVAC module alike in all aspects to that of FIG. 1 except that the cooling coil 16B routes directly to the compressor 18 and does not route past the reservoir 28 for cooling purposes. Instead, air (represented by arrows A) that has been cooled by the evaporator 15 (i.e., cooled air for the passenger compartment) is routed through duct or passage 50 to the reservoir 28 to the cool the reservoir 28. A valve 52 controlled by the temperature controller 32 regulates the amount of cooling air provided to the reservoir 28. In this embodiment, a separate duct would be provided to route cooling air to the passenger compartment.

Figure 4:
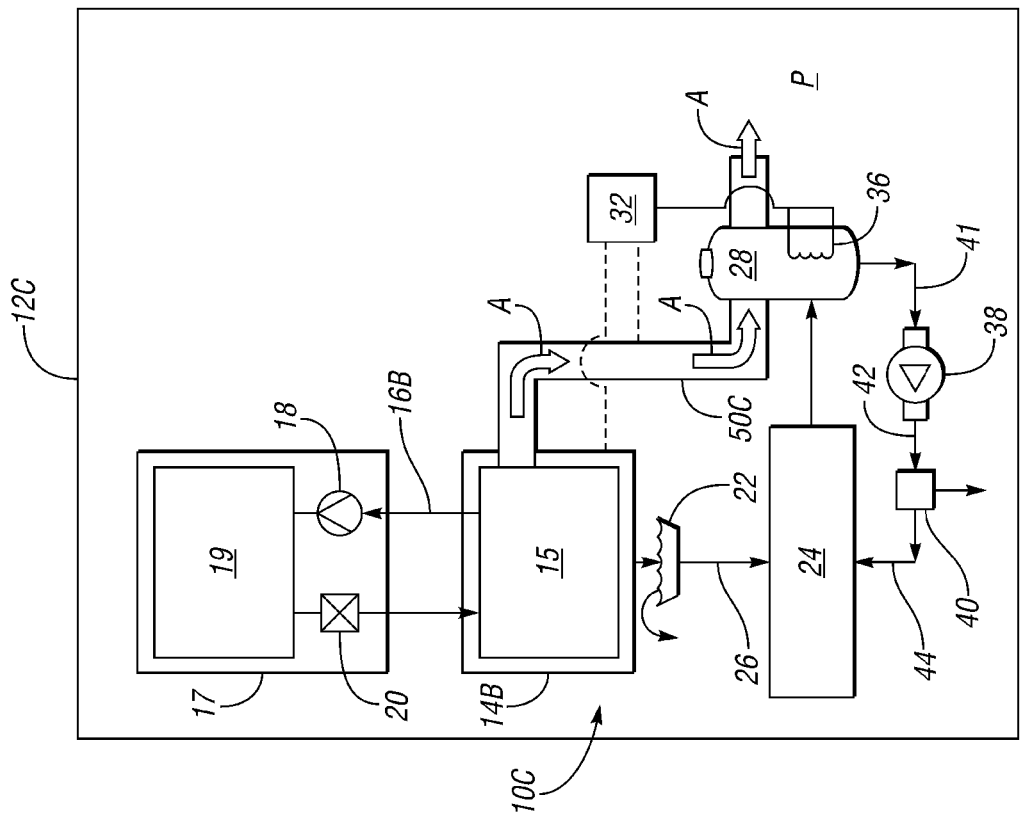
FIG. 4 is a schematic illustration of a fourth embodiment of a vehicle-integrated water harvesting system.

FIG. 4 shows a fourth embodiment of a vehicle 12C having a vehicle-integrated water harvesting system 10C. Components of water purification system 10C that are identical to those of water purification 10B of FIG. 3 are referred to with like reference numbers in the drawings. In this embodiment, air that has been cooled by the evaporator 15 is routed through duct 50C past the reservoir 28 to cool the reservoir and on to the passenger compartment, indicated as area P. The reservoir 28 may be in the passenger compartment P.

Figure 5:
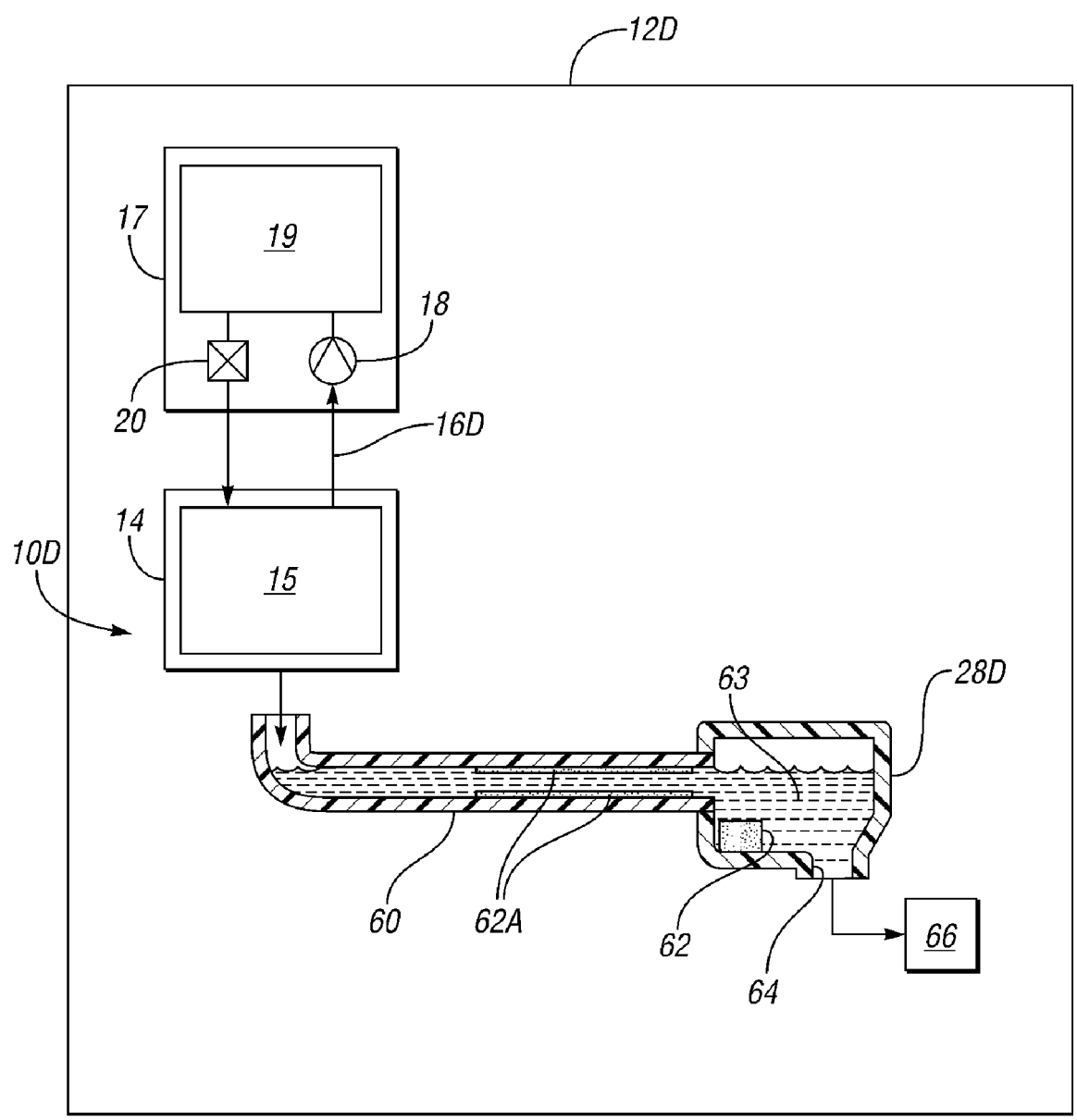
FIG. 5 is schematic illustration of another embodiment of a vehicle-integrated water harvesting system.

FIG. 5 shows a fifth embodiment of a vehicle 12D having an integrated water system 10D. Components of water purification system 10D that are identical to those of water purification 10 of FIG. 1 are referred to with like reference numbers in the drawings. Yet another potential onboard use for water emitted from water-emitting component 14 is to route the water through conduit 60 to a windshield washer fluid reservoir 28D. The conduit 60 may branch from tube 26 of FIG. 1, or the vehicle 12D may not have a purification system 24 (i.e., the emitted water may be used only for windshield washer fluid in the windshield washer fluid reservoir 28D). The emitted water may be routed through the conduit 60 by gravity, or with the assistance of a pump. The emitted water is mixed with wiper fluid concentrate 62 to create a constant supply of washer fluid in a maintenance free system (i.e., a system in which fluid does not have to be periodically added). The wiper fluid concentrate 62 may be a tablet or concentrated liquid. The concentrate 62 may be placed in the reservoir 28D, in the conduit 60, and/or may be embedded in or coated on the walls of the conduit 60, as represented by embedded concentrate 62A. The portion of the walls of the conduit 60 with the embedded concentrate or the coating on the walls is a material that disintegrates in a time-released manner to form the wiper fluid with the water. The concentrate 62, 62A is formulated to dissolve in the water in a time-released manner to maintain a constant, correctly diluted wiper fluid supply 63. Alternatively, a concentrate sensor may be used to determine dilution of the wiper fluid and a means of adding wiper fluid concentrate to maintain the correct concentrate/water mixture may be employed. For example, upon sensing that the wiper fluid is too diluted, the concentrate sensor may enable opening of a check valve or the like to permit wiper fluid concentrate to flow from a concentrate reservoir to the reservoir 28D.

At an outlet 64 of the reservoir 28D, the wiper fluid reservoir 28D is in fluid communication with a sprayer 66 that sprays wiper fluid on a windshield for cleaning of the windshield via a wiper. A wiper fluid pump may be employed for directing wiper fluid flow to the sprayer. The wiper fluid reservoir 28D may have a wiper fluid reservoir level sensor in fluid communication with water collected within the wiper fluid reservoir 28D, so that an onboard control unit (not shown) may regulate the amount of water entering the wiper fluid reservoir 28D via the conduit 60. A valve may be operatively connected to the wiper fluid reservoir level sensor for regulating the amount of water emptied into the wiper fluid reservoir 28D from the conduit 60.

Because washer fluid need not be periodically added to the reservoir 28D, the system 10D is maintenance free, and the use of plastic wiper fluid bottles traditionally necessary for wiper fluid refills is eliminated, reducing landfill waste.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a water-emitting component mounted to the vehicle and emitting water as a by-product;
   a water purification system mounted to the vehicle, operatively connected to the water-emitting component; wherein the water purification system is operable to at least partially purify the emitted water;
   a storage reservoir mounted to the vehicle and operatively connected to the purification system and configured to store the emitted water after purification; wherein the storage reservoir has a first chamber and a second chamber each of which is operatively connected to the water-emitting component and is configured to store water independently from one another;
   a temperature controller mounted to the vehicle, operatively connected to the storage reservoir, and configured to maintain the stored water at a predetermined temperature or temperature range; and
   a dispensing valve mounted to the vehicle, operatively connected to the storage reservoir, and operable to dispense water from the first and the second chambers in adjustable proportions.

2. The vehicle of claim 1, further comprising:
   a dispensing outlet mounted to the vehicle and operatively connected to the dispensing valve; wherein the dispensing valve is operable to provide purified, temperature-controlled water through the dispensing outlet from the reservoir.

3. The vehicle of claim 1, wherein the water-emitting component is an evaporator of a heating, ventilation and cooling system with a coil containing refrigerant, and further comprising:
   a valve openable and closable to control flow of refrigerant through the coil;
   wherein the temperature controller is operatively connected to the valve and is operable to open and close the valve.

4. The vehicle of claim 1, further comprising:
   a heating element operatively connected to the reservoir and operable to heat the stored water; and
   wherein the temperature controller is operatively connected to the heating element to control heating of the stored water by the heating element.

5. The vehicle of claim 1, further comprising:
   a heating element operatively connected to the first chamber and operable to heat the stored water in the first chamber; and
   wherein the temperature controller is operatively connected to the heating element to control heating of the stored water in the first chamber by the heating element.

6. The vehicle of claim 1, wherein the water-emitting component is an evaporator of a heating, ventilation and cooling system, and further comprising:
   a duct configured to route cooled air from the evaporator to the reservoir.

7. A vehicle comprising:
   a water-emitting component mounted to the vehicle and emitting water as a by-product; wherein the water-emitting component is an evaporator of a heating, ventilation and cooling system;
   a water purification system mounted to the vehicle, operatively connected to the water-emitting component; wherein the water purification system is operable to at least partially purify the emitted water;
   a storage reservoir mounted to the vehicle and operatively connected to the purification system and configured to store the emitted water after purification;
   a temperature controller mounted to the vehicle, operatively connected to the storage reservoir, and configured to maintain the stored water at a predetermined temperature or temperature range;
   a duct configured to route cooled air from the evaporator to the reservoir; and
   a valve positioned in the duct and operatively connected to the temperature controller;
   wherein the valve is openable and closable by the temperature controller to regulate the flow of the cooled air to the reservoir.

8. The vehicle of claim 7, wherein the duct is further configured to route the cooled air from the reservoir to a passenger compartment defined by the vehicle.

9. A vehicle comprising:
   a heating, ventilating and cooling (HVAC) system operable to condense water from surrounding air; wherein the HVAC system includes an evaporator with a coil containing refrigerant;
   a water purification system operatively connected to the HVAC system and including a filter operable to at least partially purify the condensed water;
   a storage reservoir mounted to the vehicle, operatively connected to the purification system, and configured to store the at least partially purified water;
   a temperature controller mounted to the vehicle, operatively connected to the storage reservoir, and configured to maintain the stored water at a predetermined temperature or temperature range; and
   a valve openable and closable to control flow of refrigerant through the coil; and
   wherein the temperature controller is operatively connected to the valve and is operable to open and close the valve.

* * * * *